Dec. 22, 1953 S. D. HAGE 2,663,141
GAS TURBINE
Filed May 3, 1952 2 Sheets-Sheet 1

INVENTOR.
SIGURD DANIEL HAGE
BY
Glenn Orloff
AGENT

Dec. 22, 1953

S. D. HAGE 2,663,141

GAS TURBINE

Filed May 3, 1952

INVENTOR.
SIGURD DANIEL HAGE

BY Glenn Orlob

AGENT

Patented Dec. 22, 1953

2,663,141

UNITED STATES PATENT OFFICE 2,663,141

GAS TURBINE

Sigurd Daniel Hage, Seattle, Wash., assignor to Boeing Airplane Company, Seattle, Wash., a corporation of Delaware Application May 3, 1952, Serial No. 285,881

4 Claims. (Cl. 60—39.16)

This invention relates to a gas turbine. The power producing section comprises a compressor and turbine mounted on the same shaft, both of radial-flow design. The power output section comprises a reduction gear and a radial-flow turbine mounted on a shaft perpendicular to and in a plane above the combined turbine-compressor shaft.

The purpose of this invention is to recover more fully the flow-energy of the working fluids by a novel arrangement of the essential turbine components and accessories. The fluid-flow passages interconnect the component parts permitting as great a mass flow as possible keeping fluid friction losses at a minimum.

In accomplishing this purpose, an object of this invention is to build the turbine structure as compactly as possible for simplicity of manufacture and ideal fluid-flow conditions.

A further object of this invention is to permit the close spacing of the compressor and turbine wheels by providing interconnecting diagonal burner passages.

A further object of this invention is to avoid abrupt directional changes in fluid motion by providing a helical surrounding diffuser to convey fluid from the power producing turbine to the power output turbine.

These and other objects of the invention will become more apparent from the following description made in reference to the drawings wherein like numerals indicate the same part throughout the several views.

Figure 1:
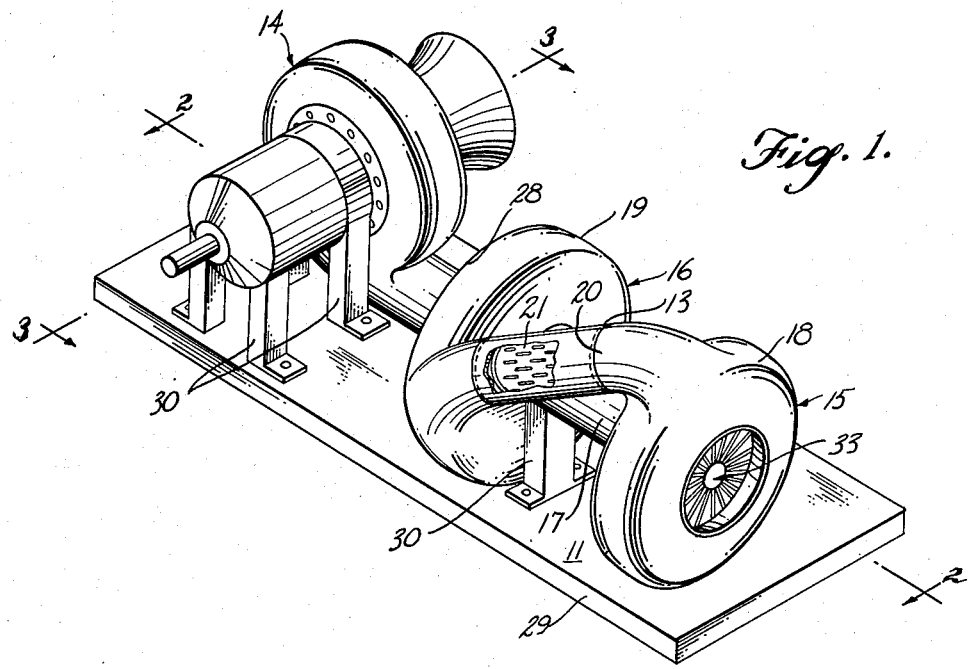
Figure 1 is a perspective view of the gas turbine drive unit.
Figure 4:
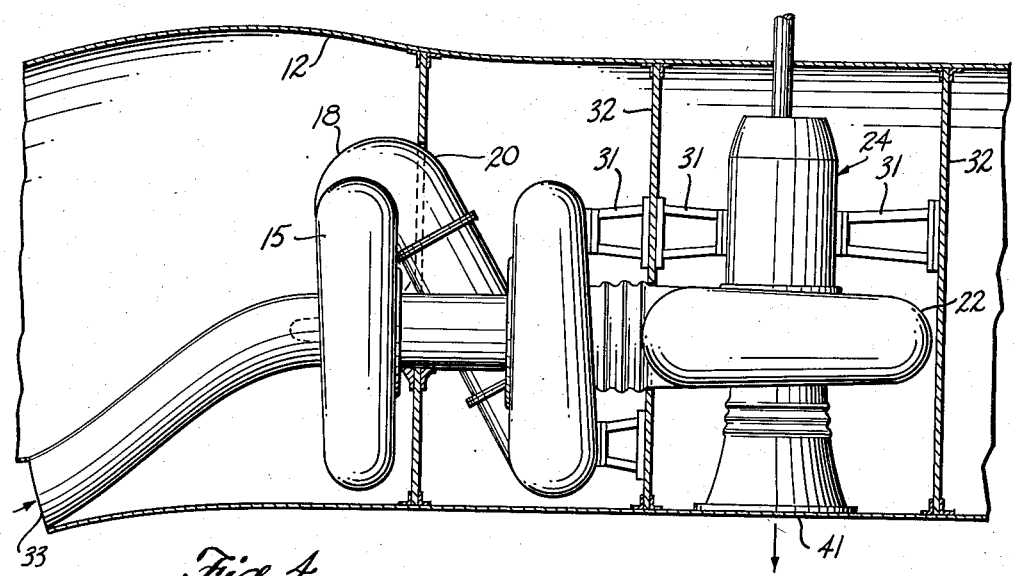
Figure 4 is a partial section view of a helicopter fuselage containing an embodiment of the unit.

More particularly, the gas turbine drive assembly shown in Figure 1 on a stationary mounting 11 or as shown in Figure 4 mounted within a helicopter fuselage 12 comprises a power producing section 13 and a power output section 14.

Figure 2:
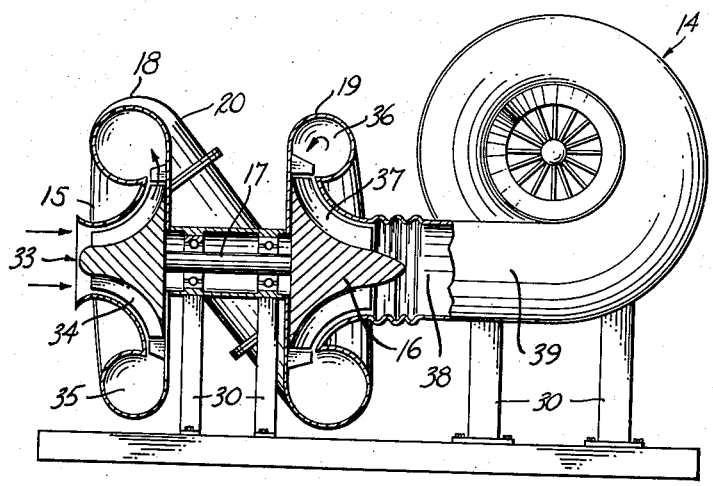
Figure 2 is an elevation, partially in section, of the unit shown in Figure 1 on line 2—2.

The producing section 13, shown in Figure 2, comprises a radial flow compressor 15 and a radial flow turbine 16 mounted on a common shaft 17 with the surrounding fluid flow chambers 18 and 19 interconnected by a diagonal combustion chamber 20 containing a burner unit 21.

Figure 3:
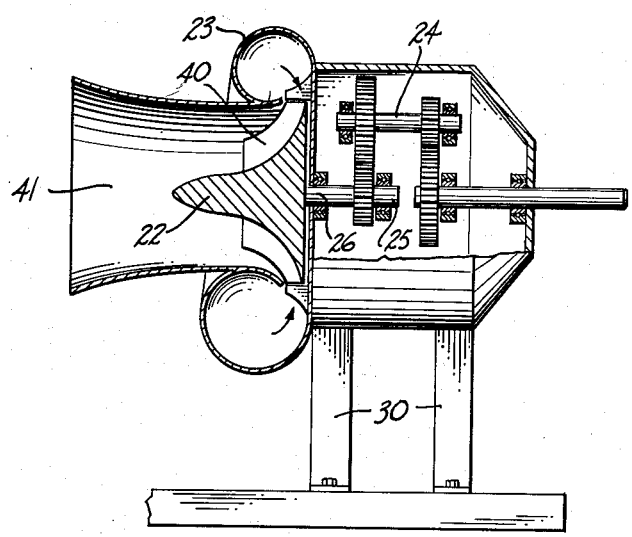
Figure 3 is an elevation, partially in section of the output portion of the unit shown in Figure 1 on line 3—3.

The output section 14, shown in Figure 3, comprises a radial flow turbine 22 with a surrounding chamber 23 and a reduction gear 24 mounted on the extension 25 of the turbine shaft 26. The shaft 26 is arranged perpendicular to but non-intersecting with the power input shaft 17, thereby locating the fluid chamber 23 opposite the central portion 28 of the power producing turbine 16.

The assembly 10 can be installed on a foundation platform 29 utilizing pedestals 30 as shown in Figure 1 or installed within the structure of a vehicle such as a helicopter as shown in Figure 4 utilizing brackets 31 attached to bulkheads 32 of the fuselage 12.

The operation follows the conventional manner wherein a starter (not shown) rotates the shaft 17 to establish a flow of air through the fluid system. The rotation of the compressor 15 draws air in through the axial intake 33, through the radial flow wheel 34 and then into the surrounding collector chamber 35. The air circulation continues through the diagonal chamber 20, into the surrounding nozzle chamber 36 and through the radial flow wheel 37 of turbine. From the turbine axial discharge 38 the air flows directly into the entrance 39 of the spiral delivery chamber 23 and is distributed through the radial flow wheel 40 of output turbine 22 into the axial exhaust discharge 41.

As fuel is injected into the burner unit 21 contained within the diagonal combustion chamber 20, the resulting diffused fluid is ignited by a conventional system (not shown) and the flow energy derived from the combustion drives the power producing turbine 16. The compressor 15 on the common shaft 17 draws air in more readily permitting withdrawal of the starting power placing the turbine drive entirely under its own power.

Operation is continued governed by conventional fuel regulation devices and by gear, clutch and brake means (not shown).

The overall operational efficiency results from the comparatively unrestricted flow of the fluids throughout the gas turbine drive assembly. The utilization of the flow energy is expended to a maximum.

This operational economy is accompanied by a manufacturing economy. The component parts are conveniently fabricated and assembled to produce the resulting desirable assembly which inherently aids in eliminating fluid-flow-frictional losses.

Having now particularly described and ascertained the nature of my said invention, and in what manner the same is to be performed, I declare that what I claim is:

1. A gas turbine comprising a radial flow turbine, a radial flow compressor driven by the said turbine, a shaft common to the said compressor and said turbine, a diagonal combustion chamber interconnecting the said compressor and said turbine, a burner positioned within the said chamber, a second radial flow turbine to receive the fluid discharge from the said first turbine, a spiral chamber connecting the said turbines, the intake of the said spiral chamber located coaxially with the axis of the compressor turbine, the said second turbine shaft with its axis perpendicular to but non-intersecting with the axis of the first turbine shaft, and a reduction gear mounted on the said second turbine shaft.

2. A gas turbine driving assembly composed of two units, one of the said units comprising a monoshaft arrangement of a centrifugal air compressor and a radial inflow turbine, a diagonal chamber conveying compressed fluids to a combustion area and to the said turbine thereby permitting a compact assembly, and the other of the said units comprising a power output turbine of radial flow design mounted with its shaft perpendicular to and spaced apart from the shaft of the said compressor turbine, a reduction gear coupled to the said power turbine, and a helical chamber with its intake opposite the axial discharge of the compressor turbine to convey the discharged fluids to the power turbine without abrupt directional-flow changes.

3. A gas turbine comprising a radial flow turbine driven centrifugal air compressor monoshaft unit, a diagonal chamber interconnecting the outer circular fluid passages of the turbine and compressor of the said unit which are in close axial relationship, a burner mounted in the said chamber, and a radial flow power turbine reduction gear drive unit, a helical chamber interconnecting the axial discharge of the said compressor turbine with the fluid intake passage of the said power turbine, the shaft of the said turbine drive unit being arranged perpendicular to and spaced apart from the shaft of the compressor-turbine unit, the fluids flowing freely between the turbines through the said helical chamber.

4. A gas turbine comprising a power producing section and a power output section, the said power producing section comprising a radial flow air compressor and a radial flow generating turbine, a shaft interconnecting the said air compressor and said generating turbine, a diagonal interconnecting combustion chamber located between the said compressor and said generating turbine, a burner contained within the said diagonal combustion chamber; the said power output section comprising a radial-flow power turbine and a reduction gear, a shaft connecting the said power turbine to the said reduction gear mounted in a plane parallel to a plane of the compressor-turbine shaft and perpendicular to the said compressor-turbine shaft and a spiral delivery chamber mounted around the said power turbine, the intake of the said spiral chamber located opposite the axial discharge of the said generating turbine to receive and direct the flow of fluid from the said generating turbine.

SIGURD DANIEL HAGE.

References Cited in the file of this patent

UNITED STATES PATENTS

| Number | Name | Date |
|---|---|---|
| 1,827,246 | Lorenzen | Oct. 13, 1931 |
| 2,469,238 | Newton | May 3, 1949 |
| 2,567,581 | Salter | Sept. 11, 1951 |
| 2,619,797 | Haworth | Dec. 2, 1952 |